United States Patent
Rewers et al.

(10) Patent No.: US 10,006,312 B2
(45) Date of Patent: Jun. 26, 2018

(54) METHOD AND CONTROL UNIT FOR OPERATING A LINE CIRCUIT FOR WASTE HEAT UTILIZATION OF AN INTERNAL COMBUSTION ENGINE

(71) Applicant: Robert Bosch GmbH, Stuttgart (DE)

(72) Inventors: Gregory Rewers, Schwieberdingen (DE); Nadja Eisenmenger, Stuttgart (DE); Achim Brenk, Kaempfelbach (DE); Dieter Seher, Ilsfeld (DE); Hans-Christoph Magel, Reutlingen (DE); Andreas Wengert, Auenwald (DE)

(73) Assignee: Robert Bosch GmbH, Stuttgart (DE)

( * ) Notice: Subject to any disclaimer, the term of this patent is extended or adjusted under 35 U.S.C. 154(b) by 1367 days.

(21) Appl. No.: 13/650,529

(22) Filed: Oct. 12, 2012

(65) Prior Publication Data

US 2013/0096801 A1 Apr. 18, 2013

(30) Foreign Application Priority Data

Oct. 12, 2011 (DE) .................. 10 2011 084 352

(51) Int. Cl.
| | |
|---|---|
| *F01K 13/02* | (2006.01) |
| *F02G 5/02* | (2006.01) |
| *F01K 23/06* | (2006.01) |
| *F01K 23/10* | (2006.01) |

(52) U.S. Cl.
CPC ............ *F01K 13/02* (2013.01); *F01K 23/065* (2013.01); *F01K 23/10* (2013.01); *F02G 5/02* (2013.01); *Y02T 10/166* (2013.01)

(58) Field of Classification Search
CPC ........ F01K 13/02; F01K 23/065; F01K 23/10; F02G 5/02; Y02T 10/166
USPC .......................................................... 60/614
See application file for complete search history.

(56) References Cited

U.S. PATENT DOCUMENTS

| | | | |
|---|---|---|---|
| 4,620,668 A | 11/1986 | Adams | |
| 4,752,697 A | 6/1988 | Lyons et al. | |
| 5,726,880 A * | 3/1998 | Bailey | F25B 49/04 700/37 |
| 5,778,861 A * | 7/1998 | Diduck | F02M 31/16 123/557 |
| 7,749,632 B2 * | 7/2010 | Zhang | H01M 8/04029 29/592.1 |
| 7,874,166 B2 * | 1/2011 | Reddin | B60H 1/00357 62/244 |
| 2001/0013409 A1 * | 8/2001 | Burk | B60H 1/025 165/240 |

(Continued)

FOREIGN PATENT DOCUMENTS

DE 102006057247 6/2008

*Primary Examiner* — Jason T Newton
(74) *Attorney, Agent, or Firm* — Michael Best & Friedrich LLP

(57) ABSTRACT

A method for operating a line circuit (4) for waste heat utilization of an internal combustion engine (2), and a control unit (1). A feed pump (6), at least one heat exchanger (8), an expansion machine (10), a condenser (12) and a control unit (1) are situated in the line circuit (4). The control unit (1) calculates a time period which is required until individual components or all the components of the line circuit (4) have reached a predefined temperature, in order to start up the line circuit (4) at least partially.

17 Claims, 2 Drawing Sheets

(56) References Cited

U.S. PATENT DOCUMENTS

| | | | |
|---|---|---|---|
| 2002/0088245 A1* | 7/2002 | Sauterleute | B01D 45/08 62/402 |
| 2005/0181246 A1* | 8/2005 | Nakaji | B60L 11/1885 429/429 |
| 2005/0262858 A1* | 12/2005 | Inaba | B60H 1/00878 62/190 |
| 2007/0175212 A1* | 8/2007 | Uno | F01C 13/04 60/519 |
| 2008/0163625 A1* | 7/2008 | O'Brien | F01K 25/08 60/651 |
| 2013/0283790 A1* | 10/2013 | Rewers | F01K 3/22 60/615 |
| 2015/0019107 A1* | 1/2015 | Whitehead | F02D 41/04 701/102 |
| 2015/0136381 A1* | 5/2015 | Hotta | F02G 5/02 165/281 |
| 2015/0273976 A1* | 10/2015 | Enomoto | B60K 6/22 165/202 |

* cited by examiner

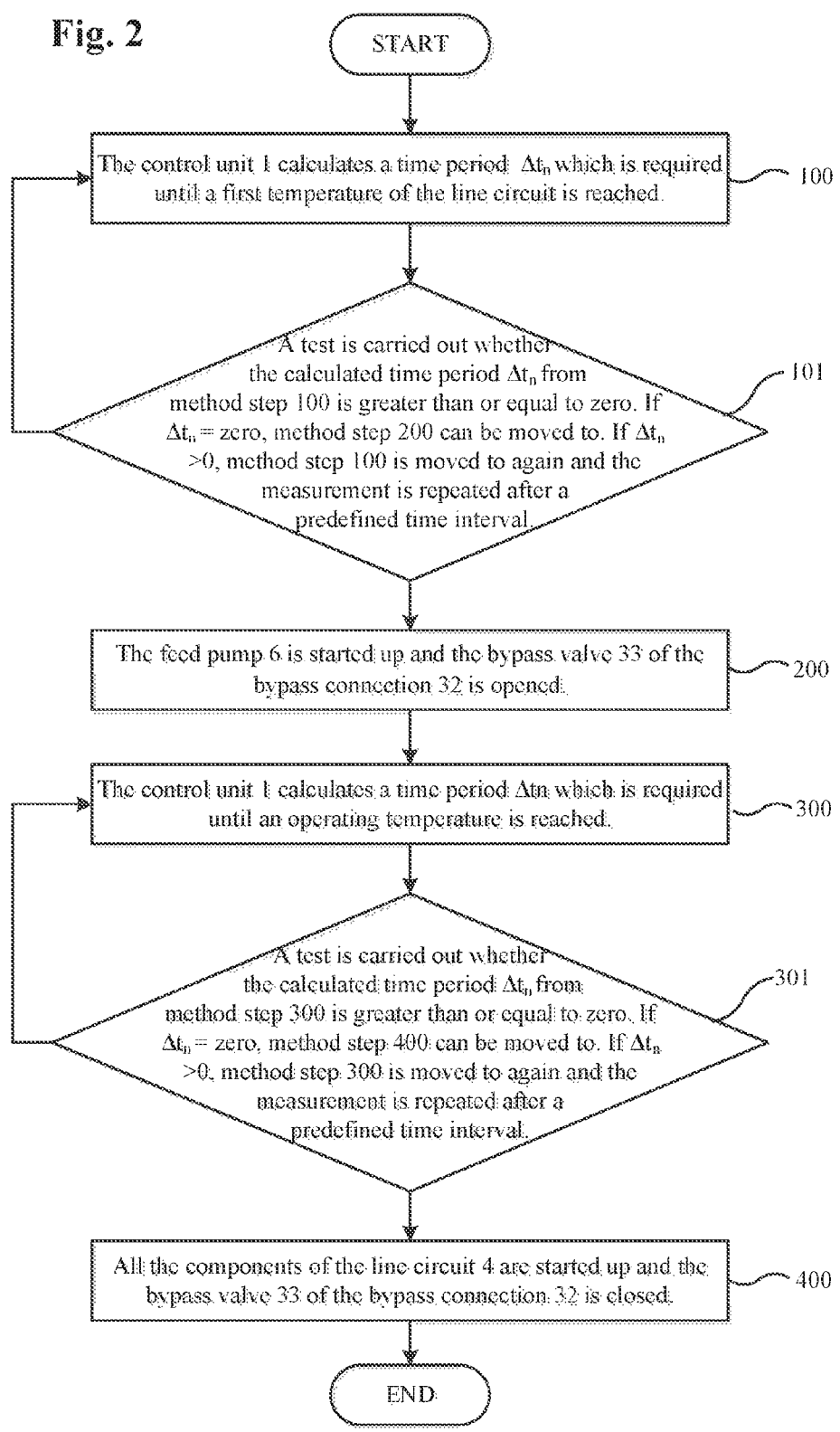

METHOD AND CONTROL UNIT FOR OPERATING A LINE CIRCUIT FOR WASTE HEAT UTILIZATION OF AN INTERNAL COMBUSTION ENGINE

BACKGROUND OF THE INVENTION

The invention relates to a method and a control unit for operating a line circuit for waste heat utilization of an internal combustion engine, and to a control unit.

DE 10 2006 057 247 A1 has already disclosed a supercharger device which serves for waste heat utilization of an internal combustion engine. At least one heat exchanger of a circuit of a working medium is accommodated in the exhaust gas section of the internal combustion engine. Moreover, an expansion machine and a delivery assembly are arranged in the circuit. A compressor part which is arranged in the intake section of the internal combustion engine is driven via the turbine part.

SUMMARY OF THE INVENTION

The method and the control unit for operating a line circuit for waste heat utilization of an internal combustion engine and the control unit of the invention have the advantage that all the components or individual components of the line circuit are started up only after a predefined temperature is reached. As a result, damage to the components of the line circuit by frozen and solidified working medium is avoided. The control unit calculates the time period until all the components or individual components of the line circuit have reached a predefined temperature. If the individual components or all the components of the line circuit are started up only after the predefined temperature is reached, it can be ensured that no more frozen working medium is situated in the relevant component. Damage can be caused during operation in the components of the line circuit by frozen or solid working medium. Only parts of the line circuit, that is to say not all the components, can also be started up, depending on the temperature in the individual components of the line circuit.

The beginning of the calculation of the time period is advantageous after a start of the internal combustion engine, since heat is transported into the line circuit only from the start of the internal combustion engine. At the same time, this procedure defines the earliest possible instant, at which the line circuit can be used for energy production.

As a result of a repetition of the calculation of the time period at periodic intervals, the instant is defined in a simple and advantageous way, at which instant the entire line circuit or individual components of the line circuit is/are started up.

The calculation of the time period is particularly advantageously as a function of the thermal energy which is output to the line circuit via the exhaust gas and/or the exhaust gas recirculation means, since the control unit can determine the instant particularly precisely, from which the line circuit can be started up.

A calculation of the time period as a function of the ambient temperature is advantageous, since few additional measuring units have to be used and there is an increased cost saving as a result.

A further advantage results if the time period is calculated which an individual component of the line circuit requires until it is deiced, since the individual components can be started up independently of one another. If the feed pump or a valve is ice-free, said components can already be started up before the expansion machine, in order to distribute the heated working medium in the line circuit.

A particular advantage results if the time period is calculated which is required until a first temperature is reached, since the feed pump and the bypass valve of the line circuit can be started up after the first temperature is reached. As a result of the starting up of the feed pump and the opening of the bypass valve, heated working medium flows past the expansion machine through the line circuit, as a result of which more rapid thawing of the remaining components of the line circuit is brought about.

The calculation of the time period which is required until the operating temperature of the line circuit is reached is advantageous, since the earliest possible instant is defined, at which the bypass valve of the bypass connection can be closed, with the result that the working medium flows through the expansion machine for energy generation.

BRIEF DESCRIPTION OF THE DRAWINGS

One exemplary embodiment of the invention is shown in the drawing and is explained in greater detail in the following description.

In the drawing:

FIG. 2 shows a flow chart of the method.

DETAILED DESCRIPTION

Figure 1:
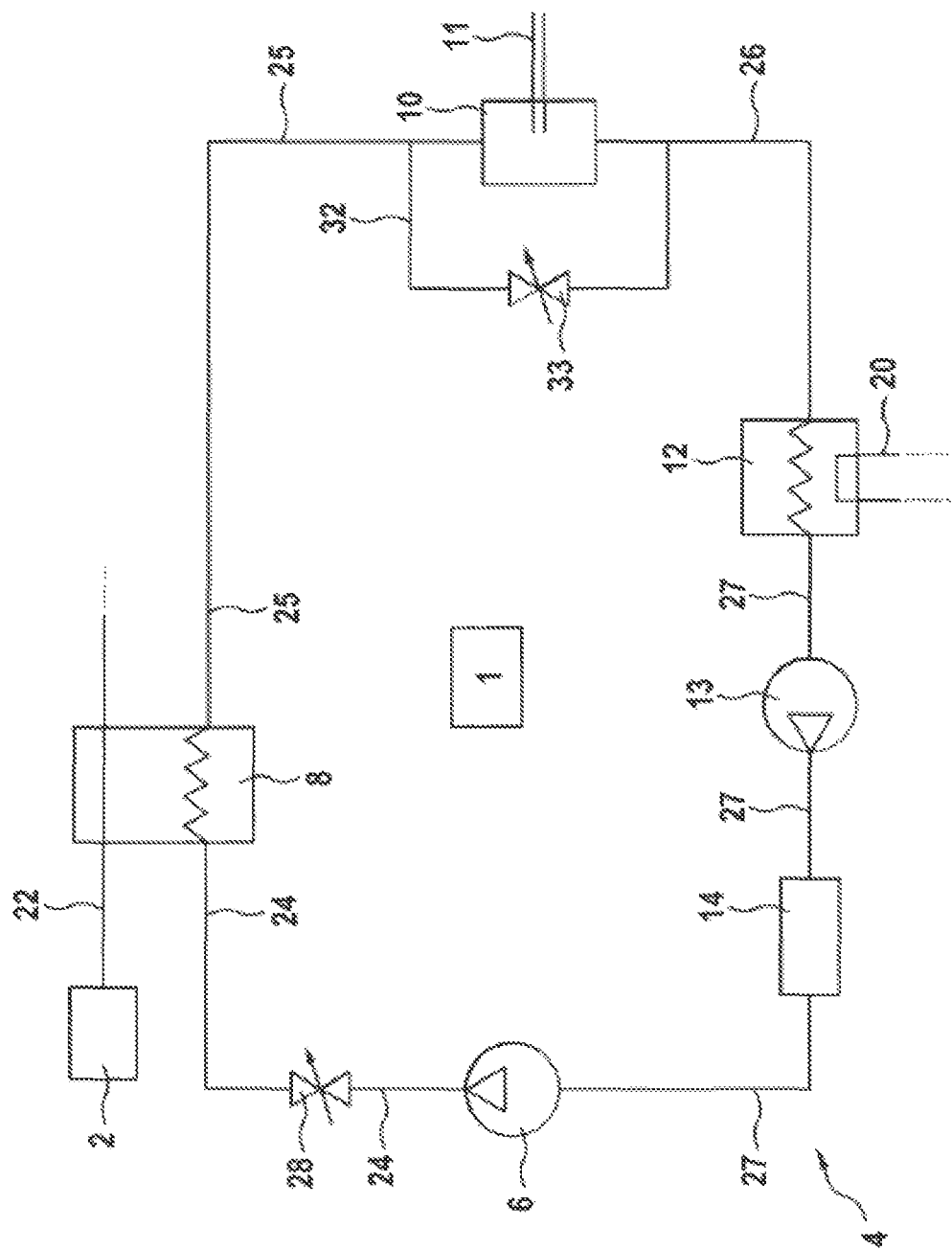
FIG. 1 shows a diagrammatic illustration of a line circuit.

A working medium circulates in the line circuit 4 for waste heat utilization of an internal combustion engine 2. At least one heat exchanger 8, an expansion machine 10, a condenser 12 and at least one feed pump 6 are arranged in the line circuit 4.

Furthermore, a control unit 1 is provided which is connected to components of the line circuit 4 and the engine control unit. As an alternative, the engine control unit can also comprise the control unit 1 and can be used to control the line circuit 4.

The internal combustion engine 2 can be configured, in particular, as an air-compressing, auto-ignition or mixture-compressing, spark-ignition internal combustion engine 2. Specifically, the line circuit 4 and the associated method for operating the line circuit 4 for waste heat utilization are suitable for applications in motor vehicles. The method for operating the line circuit 4 of the invention is also suitable, however, for other application cases.

The internal combustion engine 2 burns fuel, in order to generate mechanical energy. The exhaust gases which are produced here are ejected via an exhaust gas system, in which an exhaust gas catalytic converter can be arranged. One line section 22 of the exhaust gas system is guided through the heat exchanger 8. Thermal energy from the exhaust gases or the exhaust gas recirculation means is output via the line section 22 in the heat exchanger 8 to the working medium in the line circuit 4, with the result that the working medium can be evaporated and superheated in the heat exchanger 8.

The heat exchanger 8 of the line circuit 4 is connected to the expansion machine 10 via a line 25. The expansion machine 10 can be configured as a turbine or piston engine. The evaporated working medium flows via the line 25 from the heat exchanger 8 to the expansion machine 10 and drives the latter. The expansion machine 10 can have a drive shaft 11, via which the expansion machine 10 is connected to a load. As a result of this, for example, mechanical energy can be transmitted to a drive train or can serve to drive an electric generator of a pump or the like.

After flowing through the expansion machine 10, the working medium is guided via a line 26 to the condenser 12. The working medium which is relieved via the expansion machine 10 is cooled in the condenser 12. The condenser 12 can be connected to a cooling circuit 20. Said cooling circuit 20 can be, for example, a cooling circuit of the internal combustion engine 2.

The working medium which is liquefied in the condenser 12 is transported via a further line 27 to the feed pump 6. A feed water container 14 and a condensate pump 13 can be situated within the line 27, which condensate pump 13 transports the liquefied working medium out of the condenser 12 to the feed water container 14. The feed water container 14 serves as reservoir for the liquid working medium in the line circuit 4.

The liquid working medium is transported via the line 27 from the feed pump 6 into the line 24. A first valve 28 can be situated in the line 24, which first valve 28 serves, in the form of a pressure control valve, for pressure control of the working medium in the feed line to the heat exchanger 8. The evaporation temperature of the working medium can be regulated with the aid of the predefined pressure in the feed line to the heat exchanger 8.

The line 24 leads directly into the heat exchanger 8, in which the working medium evaporates and is optionally superheated. The evaporated working medium passes via the line 25 to the expansion machine 10 again. The working medium flows through the line circuit 4 again. As a result of the at least one feed pump 6 and the expansion machine 10, there is a passage direction of the working medium through the line circuit 4. Thermal energy which is output in the form of mechanical or electric energy can therefore be removed continuously from the exhaust gases and the constituent parts of the exhaust gas recirculation means of the internal combustion engine 2 via the heat exchanger 8.

A bypass connection 32 which is arranged parallel to the expansion machine 10 can be provided in the line circuit 4. Vaporous working medium can flow past the expansion machine 10 through the bypass connection 32. The vaporous working medium passes from the heat exchanger 8 via the line 25 into the bypass connection 32, from where it passes via the line 26 into the condenser 12.

A bypass valve 33 which is closed during normal operation of the line circuit 4 can be arranged in the bypass connection 32. If the vaporous working medium is to be guided past the expansion machine 10, for example during the standstill of the expansion machine 10, the bypass valve 33 is opened, which makes it possible for the vaporous working medium to flow past the expansion machine 10.

The bypass valve 33 can be opened and closed by the control unit 1. Furthermore, a partial opening of the bypass valve 33 by the control unit 1 is possible, in order in a targeted way to control the quantity of the vaporous working medium which flows through the bypass connection 32.

Water can be used as working medium, or another liquid which meets the thermodynamic requirements. While it is flowing through the line circuit 4, the working medium experiences thermodynamic state changes which ideally correspond to a Rankine cycle process. In the liquid phase, the working medium is compressed by the feed pump 6 to the pressure level for the evaporation. The thermal energy of the exhaust gas is subsequently output via the heat exchanger 8 to the working medium. Here, the working medium is evaporated isobarically and is subsequently superheated. Afterward, the vaporous working medium is relieved adiabatically in the expansion machine 10. Here, mechanical or electric energy is obtained. The vaporous working medium is then cooled in the condenser 12 and is fed to the heat exchanger 8 again via the feed pump 6.

On account of the utilization of water or another liquid as working medium, the working medium experiences a state change at low temperatures, in the case of which state change it can solidify. The components of the line circuit 4 cannot be started up as long as frozen or solidified working medium is situated in the line circuit 4, since otherwise components of the line circuit 4 are destroyed or damaged.

After a standstill of the internal combustion engine 2, the expansion machine 10 and the at least one pump 6, 13 are switched off. The working medium no longer circulates through the line circuit 4. At low external temperatures, the working medium can experience a state change, in which it solidifies. Even if measures for emptying the line circuit 4 are performed, liquid or vaporous working medium can still be situated in the line circuit 4, which working medium can solidify.

The method according to the invention for operating a line circuit 4 for waste heat utilization of an internal combustion engine 2 shows one possibility of starting up the components of the line circuit 4 again only after a predefined temperature is reached.

To this end, the control unit 1 calculates a time period which is required until individual components or all the components of the line circuit 4 have reached the predefined temperature. The time period is calculated as a function of at least one measured variable.

The predefined temperature lies above the freezing point of the working medium or at a temperature, at which the working medium has a viscosity, at which the line circuit and all the components or individual components can be started up in an unrestricted manner.

Components of the line circuit 4 are to be understood to be the heat exchanger 8, the expansion machine 10, the condenser 12, the feed pump 6 and all the lines which connect said components. Furthermore, all the relatively small components, such as valves, are to be understood to be components of the line circuit 4.

The thermal capacities of the individual components in the line circuit 4 and the thermal conductivity of the individual components and of the connections between said components serve as parameters which the control unit 1 requires to calculate the time period.

The time period which the entire line circuit 4 requires until a predefined temperature is reached can be calculated as a function of the thermal energy which is output, after the starting up of the internal combustion engine 2, via the heat exchanger 8 from the exhaust gas or the exhaust gas recirculation means to the line circuit 4 and/or as a function of the ambient temperature, such that the thermal energy and/or the ambient temperature may be the at least one measured variable, with the known thermal capacities and thermal conductivities of the components being taken into consideration.

The time period until a predefined temperature is reached is calculated by a control unit, in which calculating algorithms and models are stored which take the thermal capacities, thermal conductivity and arrangement of the components in the line circuit and in the engine compartment into consideration.

The thermal energy which is output to the line circuit 4 via the heat exchanger 8 from the exhaust gases and the exhaust gas recirculation means can either be measured directly or can be calculated with the aid of model calculations as a function of engine control parameters which the engine control unit of the internal combustion engine 2 transmits to the control unit 1 of the line circuit 4.

The control unit 1 can also take the driving speed into consideration in order to calculate the time period until a predefined temperature is reached, since the ambient temperature can change as a function of the driving speed.

As an alternative, the control unit 1 can also calculate the time period which the individual components require until a predefined temperature is reached.

For example, 5° C. can be selected as the predefined temperature, at which one component or all the components of the line circuit 4 is/are considered to be ice-free, since it can be assumed at such a temperature, at least for water as working medium, that small ice pieces or lumps of ice are no longer situated within a component. However, the temperature, at which a component is ice-free, depends greatly on the selection of the working medium, with the result that it has to be clarified in advance as a function of the working medium, above which temperature lumps of ice or ice pieces are no longer situated in a component of the line circuit 4. As an alternative, it can be tested above which temperature the viscosity is suitable for operation of the entire line circuit 4 or individual components of the line circuit 4.

If a temperature, at which the components of the line circuit 4 are ice-free, is selected as predefined temperature, damage of individual components can be avoided during the starting up of the line circuit 4.

In addition to the thermal energy which passes via the heat exchanger into the line circuit 4, the radiant heat of the internal combustion engine 2 or of other units in the engine compartment which generate radiant heat plays a role for the time period which the components of the line circuit 4 require until a predefined temperature is reached.

Depending on the installation situation, the size and the weight of the components, the components require different times until a predefined temperature is reached. On account of their small size and low thermal capacity, the control valve 28 and the feed pump 6 reach a predefined temperature more rapidly than the expansion machine 10 which is larger and has a greater thermal capacity.

For this reason, the feed pump 6 and small components of the line circuit 4 already reach a temperature, at which they are ice-free and can be operated without problems, after a shorter time period than the expansion machine 10.

In order to accelerate the exchange of thermal energy within the line circuit 4 and therefore to ensure more rapid thawing of the remaining components of the line circuit 4, the feed pump 6 can be started up before the expansion machine 10.

FIG. 2 shows a flow chart diagram which shows the individual method steps of the method for operating a line circuit 4 for waste heat utilization of an internal combustion engine 2.

The method can start, in the case of a start S of the internal combustion engine 2, at ambient temperatures below the freezing point of the working medium. As an alternative, a temperature threshold above the freezing point is also possible for the start S of the method.

In method step 100, the control unit 1 calculates the time period $\Delta t_n$ which is required until a first temperature of the line circuit is reached. Here, as has already been described, calculating algorithms can be applied which take the introduced thermal energy and/or the ambient temperature into consideration.

As first temperature, a temperature is selected, at which the feed pump 6 and small valves, such as the bypass valve 33, are ice-free and can be started up.

In method step 101, a test is carried out as to whether the calculated time period $\Delta t_n$ until the first temperature is reached is greater than or equal to zero. If the calculated time period $\Delta t_n$ is equal to zero, the first temperature has already been reached and method step 200 can be moved to. If the calculated time period $\Delta t_n$ is greater than zero, that is to say the temperature is below the first temperature, the measurement is repeated after a predefined time interval.

In the case of the renewed calculation of the time period $\Delta t_n$ until the first temperature is reached, the preceding value of the calculated time period $\Delta t_{n-1}$ until the first temperature is reached can be taken into consideration. The calculation of the time period $\Delta t_n$ until the first temperature is reached is repeated at periodic intervals until the calculated time period $\Delta t_n$ until the first temperature is reached is equal to zero and method step 200 is moved to.

As an alternative, it is also possible that method step 200 is moved to directly from method step 100 and method step 101 is missed out. In this case, in method step 100, the time duration $\Delta t_n$ which is required until the first temperature of the line circuit is reached is calculated. After an interruption or pause which corresponds to the time period $\Delta t_n$, method step 200 is carried out.

In method step 200, the feed pump 6 is started up and the bypass valve 33 of the bypass connection 32 is opened, with the result that the working medium can flow past the expansion machine 10. As a result of the starting up of the feed pump 6 and the opening of the bypass valve 33, the working medium can circulate through the line circuit 4 and distribute the thermal energy in the line circuit 4 in an improved manner.

If the bypass connection 32 is situated in the vicinity of the housing of the expansion machine 10 or the bypass connection 32 leads through the housing of the expansion machine 10, this brings about a positive effect on the time period until the expansion machine 10 is ice-free, since the working medium which is already heated outputs thermal energy to the expansion machine 10.

In method step 300, the control unit 1 calculates the time period $\Delta t_n$ which is required until an operating temperature is reached. Here, as has already been described, calculating algorithms can be applied which take the introduced thermal energy and/or the ambient temperature into consideration. Furthermore, it is taken into consideration that the bypass valve 33 is open and the expansion machine 10 is heated more rapidly by the working medium which circulates through the line circuit 4.

The operating temperature of the line circuit is reached when all the components of the line circuit 4 and the working medium have reached a temperature, at which the line circuit 4 can be started up completely and the expansion machine 10 can be used for energy generation.

In method step 301, a test is carried out as to whether the calculated time period $\Delta t_n$ until the operating temperature is reached is greater than or equal to zero. If the calculated time period $\Delta t_n$ until the operating temperature is reached is equal to zero, the operating temperature has already been reached, and method step 400 can be moved to. If the calculated time period $\Delta t_n$ until the operating temperature is greater than zero, that is to say the current temperature is below the operating temperature, method step 300 is moved to again and the measurement is repeated after a predefined time interval.

In the case of the renewed calculation of the time period $\Delta t_n$ until the operating temperature is reached, the preceding value of the calculated time period $\Delta t_{n-1}$ until the operating temperature is reached can be taken into consideration. Method steps 300 and 301 are repeated at periodic intervals until the calculated time period $\Delta t_n$ until the operating temperature is reached is equal to zero, and method step 400 is moved to.

As an alternative, it is also possible that method step 400 is moved to directly from method step 300 and method step 301 is missed out. In this case, in method step 300, the time duration $\Delta t_n$ which is required until the operating temperature of the line circuit is reached is calculated. After an interruption or pause which corresponds to the time period $\Delta t_n$, method step 400 is carried out.

In method step 400, all the components of the line circuit 4 are started up and the bypass valve 33 of the bypass connection 32 is closed, with the result that the working medium flows through the expansion machine 10. The end E of the method is reached.

In an alternative embodiment of the method, only the time period until the operating temperature is reached can also be calculated, with the result that method steps 100 to 200 are omitted.

What is claimed is:

1. A method for operating a line circuit (4) for waste heat utilization of an internal combustion engine (2), the line circuit having as components a feed pump (6), an expansion machine (10), and a condenser (12), comprising:
measuring at least one variable;
determining, with a control unit (1), a time period required for individual components or all the components of the line circuit (4) to rise to a predefined temperature, wherein the time period is determined as a function of the at least one variable and without measuring temperatures of the components; and
starting at least one of the components after expiration of the time period.

2. The method according to claim 1, characterized in that the predefined temperature is required to start up the line circuit (4) at least partially.

3. The method according to claim 1, characterized in that the determining of the time period begins after a start of the internal combustion engine (2).

4. The method according to claim 1, characterized in that the determining of the time period is repeated at periodic intervals.

5. The method according to claim 1, characterized in that the at least one variable is a thermal energy which is output to the line circuit (4) via an exhaust gas.

6. The method according to claim 1, characterized in that the at least one variable is an ambient temperature.

7. The method according to claim 1, characterized in that a temperature, at which individual components or all the components of the line circuit (4) are ice-free, is selected as the predefined temperature.

8. The method according to claim 1, wherein the predefined temperature is that at which at least the feed pump (6) and a bypass valve (33) in a bypass connection (32) are ice-free, or the predefined temperature is a predefined operating temperature of the line circuit (4).

9. The method according to claim 8, wherein the predefined temperature is that at which at least the feed pump (6) and the bypass valve are ice-free, and wherein the feed pump (6) is started up after the time period has expired, the bypass valve (33) being opened, with the result that the working medium flows past the expansion machine (10).

10. The method according to claim 8, wherein the predefined temperature is the predefined operating temperature of the line circuit (4), and wherein all the components of the line circuit (4) are started up after the time period has expired, the bypass valve (33) being closed, with the result that the working medium flows through the expansion machine (10).

11. The method according to claim 1, wherein the control unit (1) is configured for carrying out the method.

12. The method according to claim 11, characterized in that algorithms and models are stored in the control unit (1), which algorithms and models determine the predefined temperature under consideration of the thermal capacities and thermal conductivities of the components of the line circuit (4).

13. The method according to claim 1, wherein the at least one variable is a thermal energy and an ambient temperature, and wherein the thermal energy is thermal energy output to the line circuit (4) via an exhaust gas.

14. A method for operating a line circuit (4) for waste heat utilization of an internal combustion engine (2), the line circuit having as components a feed pump (6), an expansion machine (10) and a condenser (12), comprising:
measuring at least one of an ambient temperature and a thermal energy, wherein the thermal energy is thermal energy output to the line circuit (4) via an exhaust gas;
determining, with a control unit (1), a time period required for individual components or all the components of the line circuit (4) to rise to a predefined temperature, wherein the time period is determined as a function of the at least one of the ambient temperature and the thermal energy, and wherein the time period is determined without measuring temperatures of the components; and
starting at least one of the components after expiration of the time period.

15. The method according to claim 14, wherein the at least one of the ambient temperature and the thermal energy is the ambient temperature.

16. The method according to claim 14, wherein the at least one of the ambient temperature and the thermal energy is the thermal energy.

17. The method according to claim 14, wherein the at least one of the ambient energy and the thermal energy is the ambient temperature and the thermal energy.

* * * * *